Feb. 23, 1954     E. H. YONKERS ET AL     2,670,452
PROTECTIVE DEVICE

Filed Nov. 14, 1952     2 Sheets-Sheet 1

INVENTORS.
EDWARD H. YONKERS
RONALD F. HUBER
BY
ATTORNEYS

Feb. 23, 1954

E. H. YONKERS ET AL 2,670,452

PROTECTIVE DEVICE

Filed Nov. 14, 1952

INVENTORS.
EDWARD H. YONKERS
RONALD F. HUBER

BY Mason, Kolehmainen, Rathburn & Wyss

ATTORNEYS

Patented Feb. 23, 1954

2,670,452

UNITED STATES PATENT OFFICE 2,670,452

PROTECTIVE DEVICE

Edward H. Yonkers, Glencoe, and Ronald F. Huber, Evanston, Ill., assignors to Joslyn Mfg. & Supply Co., Chicago, Ill., a corporation of Illinois Application November 14, 1952, Serial No. 320,474

10 Claims. (Cl. 313—231)

The present invention relates to a protective device, and more particularly a lightning arrester designed to afford protection on secondary circuits and hence may be termed a secondary arrester.

It is, of course, well known that power systems comprise the primary or high voltage portion thereof, and the secondary or low voltage portion thereof. It is general practice with power systems to protect the primary portion thereof with lightning arresters. These lightning arresters are associated with the distribution transformers, the power stations and the like. In other words, the primary equipment of power systems has been extensively protected heretofore with protective devices in the form of lightning arresters.

In recent years there has been a rapid extension of electrical power distribution, particularly to nonurban areas, and this has brought with it an increase in hazard and damage caused by lightning effects on low voltage secondary circuits. This is due, of course, to the increased lightning exposure of outlying distribution systems, and also to the fact that such outlying systems frequently extend beyond the range of good grounding afforded by extensive underground water pipe networks which are common to urban territories and sometimes to suburban territories. Although heretofore adequate lightning protection has been afforded for primary equipment, there has not been available satisfactory lightning protection for secondary equipment. In fact, there are frequently encountered on rural and suburban systems the following lightning caused troubles:

(1) Damage to secondary coils of the distribution transformers even though the primaries are completely protected;
(2) Blowing of fuses or opening of circuit breakers due to secondary flashovers;
(3) Damage to watt-hour meters;
(4) Damage to customers' appliances.

All of the four above-mentioned instances of damage are caused by excessive voltage differentials on the secondary equipment normally designed for 120 volts in this country but often subjected to many thousands of volts due to lightning conditions. It would be desirable, therefore, to provide satisfactory protection for secondary equipment so that, combined with the primary protection now effectively accomplished, complete over-all protection would be afforded in a manner to effectively limit over-voltages between phase and neutral to harmless levels.

It is an object of the present invention to provide a new and improved protective device particularly designed for protecting secondary equipment.

It is another object of the present invention to provide an improved secondary arrester which may be manufactured in a simple and economical manner and which will afford adequate protection to secondary equipment supplementing the protection commonly afforded to primary equipment.

Still another object of the present invention resides in a secondary arrester having a minimum of parts which can be readily assembled in a manner to provide accurately controlled protection of secondary equipment.

A still further object of the present invention resides in an improved secondary arrester which requires no support other than that afforded by electrically connecting the arrester to the secondary equipment to be protected.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings, in which.

The present invention is primarily concerned with a secondary arrester or protective device which involves a minimum of parts which can be assembled in a simple and expeditious manner and yet will afford adequate protection for secondary equipment. It comprises an enclosure accurately molded from insulating material in a manner to position conductors connected to terminals of the device in accurately spaced parallel relationship within the housing. Additional means are provided to accurately space electrodes defining arc discharge paths within the housing and electrically connect said electrodes to said conductors.

Figure 9:
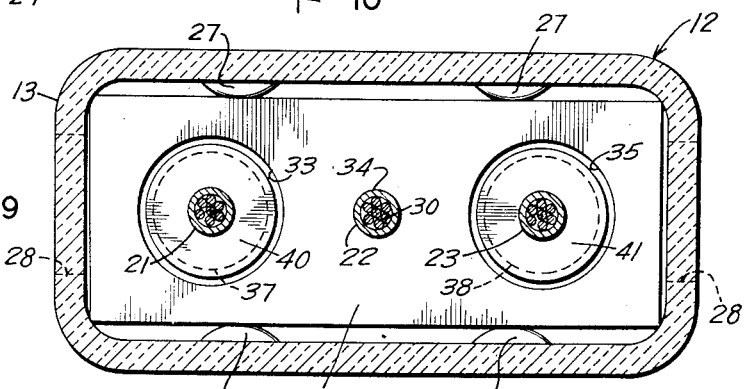
Fig. 9 is a sectional view taken on line 9—9 of Fig. 8, assuming that Fig. 8 shows the complete structure.
Figure 10:
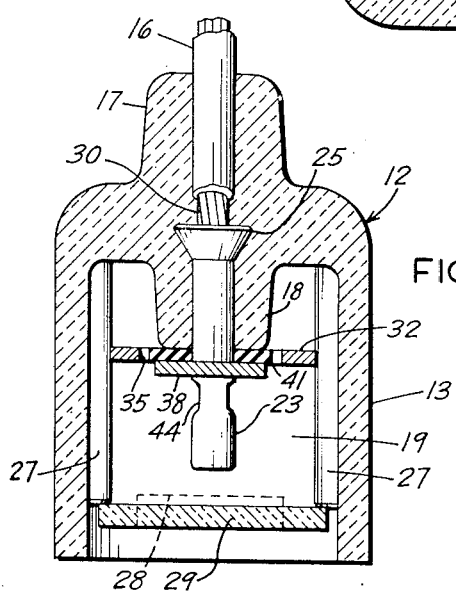
Fig. 10 is a sectional view taken on line 10—10 of Fig. 8, again assuming that Fig. 8 shows the complete structure.

Referring now to the drawings, there is illustrated the protective device of the present invention, generally designated by the reference numeral 12 and comprising an insulating housing 13 from which a plurality of insulated conductors 14, 15 and 16 extend for making electrical connection with secondary equipment to be protected. It will be understood that the housing 13 may have numerous shapes without departing from the present invention, but, as best illustrated in the drawings, and particularly in Figs. 8, 9 and 10 thereof, it is illustrated as a rectangular housing having integrally formed protuberances 17 on one wall thereof extending outside the housing to define insulated bushings for the insulated conductors 14, 15 and 16. Similar protuberances 18, also integrally formed with the housing 13, extend inside the housing defining similar bushings within the chamber 19 defined by the housing 13.

It is essential in accordance with the teachings of the present invention that the housing be accurately formed with respect to dimensions and relative positions of the parts thereof, and to this end housing 13 is preferably molded in an accurate mold of a suitable insulating material lending itself to such accurate molding operation. A suitable material may comprise a synthetic resin such as Bakelite. In accordance, further, with the present invention a plurality of tubular conductors 21, 22 and 23, closed at one end as indicated at 24 in Fig. 8 of the drawings, are molded in fixed positions centrally of the bushings 18 so as to extend beyond the bushings into the housing 13. For the purpose of firmly holding these tubular conductors within the wall of the housing 13 having the protuberances 17 and 18 formed thereon, the open ends of the conductors 21, 22 and 23 are flared as indicated at 25 (Figs. 8 and 10), these flares providing an anchor to firmly support the tubular conductors in accurately spaced parallel insulated relationship within the housing 13.

For purposes which will become apparent as the following description proceeds, accurately formed positioning ribs 27 are molded integrally with the walls of housing 13. These positioning ribs extend in a direction parallel with the tubular conductors already described. The housing 13 further includes, in what might be termed the end walls thereof, suitable openings 28 for supporting a cover 29 closing the open side or end of the housing 13. This open side is opposite the wall supporting the tubular conductors 21, 22 and 23.

Figure 8:
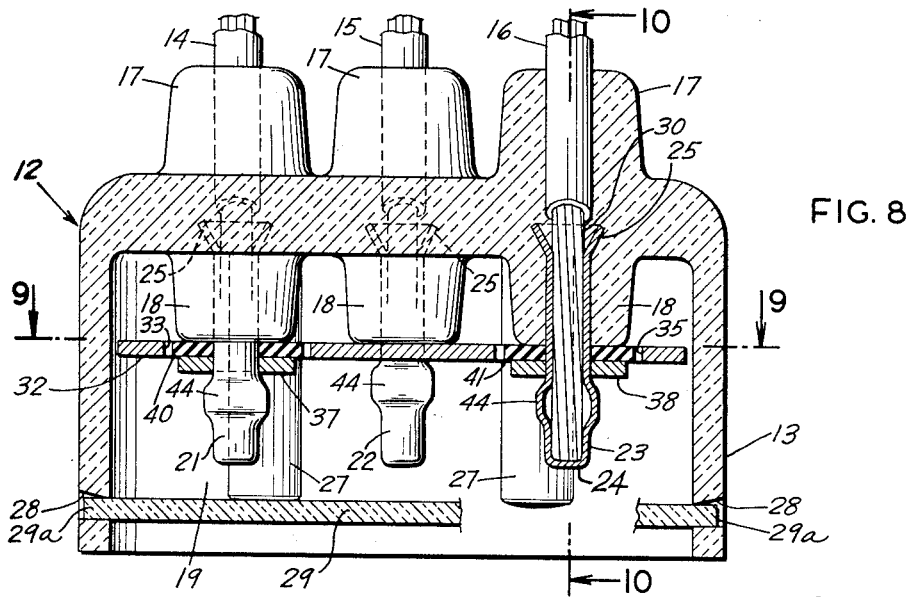
Fig. 8 is an enlarged sectional view of Fig. 3 with certain portions thereof cut away more clearly to illustrate the details of construction of the protective device of the present invention.

The first step in manufacturing the protective device of the present invention resides in forming the housing 13 with the tubular conductors 21, 22 and 23 supported therein in accurately spaced, parallel, insulated relationship. This is accomplished by employing an accurate mold with means for obtaining the openings 28, and, additionally, suitable openings through the wall of the housing 13 having the bushings 17 formed thereon for receiving the conductors 14, 15 and 16. These openings must lead to the interior of the tubular conductors 21, 22 and 23. The conductors 14, 15 and 16 may be conventional insulated conductors including, as indicated in Fig. 8, a multi-conductor cable with the uninsulated ends 30 thereof extending into the tubular conductors 21, 22 and 23 to make ready electrical connection therewith. Preferably the openings for the insulated conductors 14, 15 and 16 conform closely to the exterior diameter of the insulated conductors to reduce the possibility of rain or moisture entering through these openings. In any event, such rain or moisture could only enter into the interior of the hollow or tubular conductors 21, 22 and 23, and in no event could such moisture reach the chamber 19 defined in housing 13. The molding operation is very accurate, so that the bottom ends of the bushings 18, as viewed in Fig. 8, are disposed to define a plane perpendicular to the longitudinal axes of the tubular conductors 21, 22 and 23.

In order to provide one electrode for the secondary arrester of the present invention there is provided a conducting plate 32, preferably formed of copper or similar material and dimensioned approximately to correspond with the dimensions of the interior of the housing 13 along a plane defined by the bottoms of the bushings 18 perpendicular with the axes of the tubular conductors 21, 22 and 23. In an embodiment built in accordance with the present invention the plate 32 was approximately ⅞ of an inch wide, 2¼ inches long, and approximately ₁⁄₁₆ of an inch thick. These dimensions are by way of example only and do illustrate the compactness of the protective device of the present invention.

For the purpose of accommodating the plate 32 and supporting it against the center protuberances 18 within chamber 19 of the housing 13, the plate is provided with a plurality of openings 33, 34 and 35. As specifically illustrated, the opening 34 for the center tubular conductor 22 which is the ground or neutral conductor is substantially smaller than the openings 33 and 35. This is because the plate 32 is electrically connected to the center tubular conductor 22, and it is intended that annular arc discharge paths be established between the plate 32 and the outer tubular conductors 21 and 23 which are the phase or line conductors. In a commercial embodiment built in accordance with the present invention the openings 33 and 35 are of the order of ½ inch in diameter, whereas the opening 34 is of the order of ₁⁄₁₆ of an inch in diameter.

To establish an arc discharge path, there are provided a pair of phase electrodes 37 and 38 in the form of conducting washers having central openings to receive therein the conductors 21 and 23, as clearly indicated in Fig. 8 of the drawings. If the conducting washers are made of smaller diameter than the openings 33 and 35, it will be apparent that an annular discharge path will be provided between the periphery of the electrodes 37 and 38, and the perimeter of the cooperating openings 33 and 35, respectively, in the plate 32. The width of this discharge path will, of course, determine the impulse spark-over voltage of the protective device of the present invention.

Figure 11:
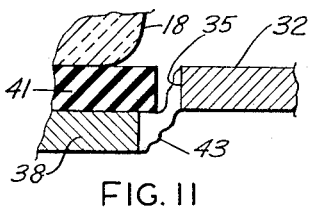
Fig. 11 is an enlarged fragmentary view to illustrate how the protective device of the present invention functions.

For the purpose of aiding in extinguishing any arc discharge which may appear across the arc gaps between electrodes 37 and 38 and the plate 32, there is provided in accordance with the present invention suitable gas evolving insulating material from which an arc extinguishing insulating gas is evolved when subjected to the heat of an arc. To this end there are provided a pair of insulating washers 40 and 41, preferably formed of horn fiber or other suitable gas evolving insulating material which are of a thickness comparable with that of plate 32, or preferably slightly thicker as indicated in Fig. 11 of the drawings, and disposed in the openings 33 and 35, respectively, with the surface adjacent bushings 18 in the plane of the corresponding surface of plate 32. The insulating washers 40 and 41 are preferably of slightly larger diameter than the electrodes 37 and 38, but of smaller diameter than the openings 33 and 35. Thus, they may readily be assembled in the openings and any arc drawn between the plate 32 and the electrodes 37 and 38, such as indicated at 43 in Fig. 11 of the drawings, will come in contact with the edge of the insulating washers 40, thereby causing gas to be evolved from the washers 40 and 41 to aid in extinguishing any arc drawn, such as 43.

The length of the arc gap between the electrodes 37 and 38 and the plate 32 may be adjusted to any desirable value. It is known that the modern watt-hour meter will withstand a minimum impulse voltage of approximately 9 kilovolts. In a commercial embodiment built in accordance with the present invention the top level of operation of the protective device was established at approximately 50% of the minimum impulse withstand voltage of the modern watt-hour meter, in other words, a critical impulse spark-over voltage of approximately 4.3 kilovolts. This represents a spark gap of less than $\frac{1}{16}$ inch between phase and neutral or ground. This, moreover, means that any 120 volt alternating current equipment or appliance which has an impulse insulation or spark-over strength equivalent to a $\frac{3}{32}$ of an inch air gap or greater, will be afforded positive protection by the protective device of the present invention.

An important feature of the present invention resides in the simple manner in which electrodes may be assembled in the housing 13 in accurately spaced position and firmly maintained in this position. To this end the plate 32 is first placed in position against the protuberances 18. The particular dimensioning of the plate 32 and the integral ribs 27 insure that plate 32 is accurately positioned within housing 13 in the manner shown in Fig. 8 of the drawings with the tubular conductors 21, 22 and 23 concentrically disposed within openings 33, 34 and 35, respectively, as clearly shown in Fig. 9 of the drawings. The gas evolving insulating washers 40 and 41 are then slipped into place, as are also the electrodes 37 and 38 in face to face engagement with the insulating washers 40 and 41, respectively. The insulated conductors 14, 15 and 16 are then inserted into the corresponding tubular conductors 21, 22 and 23 with the uninsulated ends 30 in electrical contact with the interior walls of the tubular conductors. By means of a simple crimping tool all three conductors 21, 22 and 23 are deformed as indicated at 44, or crimped to positively lock all the elements in the position shown in Fig. 8 with good electrical connection between the conductors 14 and 21 and the electrode 37, between the conductors 16 and 23 and the electrode 38, and between the conductors 15 and 22 and the plate 32. Moreover, with this arrangement the electrodes 37 and 38 and the associated insulated washers 40 and 41 are concentrically disposed within the openings 33 and 35, respectively, thereby assuring a uniform arc gap around the electrodes 37 and 38.

It will be apparent that the protective device of the present invention, as illustrated above, is a two-pole three-wire device enclosed in a weatherproof housing and usable on any two-wire or three-wire single phase circuit. When used on a two-wire circuit the two line or phase leads 14 and 16 may be connected in parallel to the single 120 volt line, and the center lead 15 connected to the neutral. In a commercial embodiment built in accordance with the present invention the arrester 12 weighed only four ounces, and, hence, another aspect of the present invention is the fact that no supporting bracket is necessary but the arrester may merely be supported by its leads as indicated in Figs. 1 and 2 of the drawings.

The closure 29 is preferably formed of a sheet of insulating material such as Bakelite, and comprises tabs 29a at each end insertable into the openings 28 in housing 13. The cover 29 may be bowed or otherwise distorted to facilitate inserting the tabs 29a into the openings 28. It is intended that the cover remain in place to close the housing once the protective device is assembled. In the case of a severe lightning stroke sufficient gas may be developed within the housing 13 to blow the cover 29 out, and, if desired, the cover may remain unreplaced for a time so that a particular public utility may have an indication of the number of relatively severe lightning strokes which occur on the secondary side of its system during a predetermined time period.

Although for most applications the conductors 14, 15 and 16 would be formed of a good conducting material such as copper, there may be situations where it is desired to limit the follow current which may flow, and in those cases the conductors 14, 15 and 16 might be made of stainless steel or other material having a slight resistance in series with the arc discharge paths defined within the chamber 19.

Figure 1:
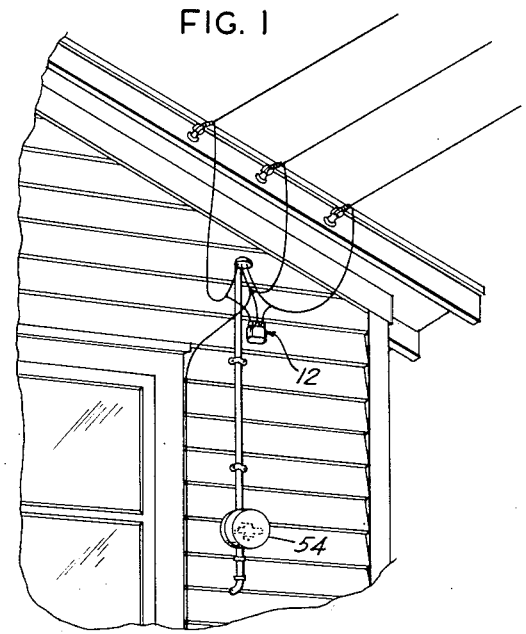
Fig. 1 is a schematic showing of one application of the protective device of the present invention.
Figure 2:
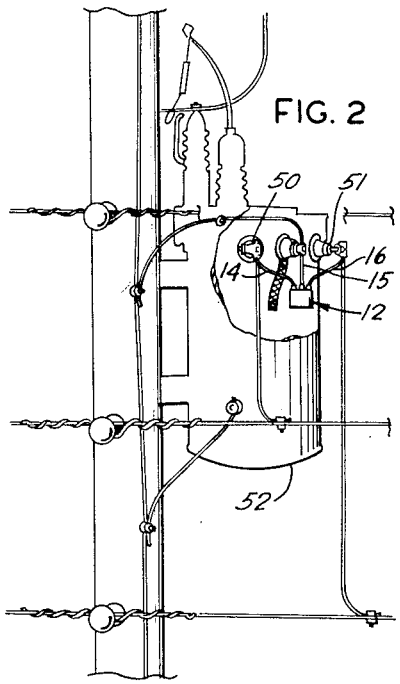
Fig. 2 is a schematic showing of another application of the protective device of the present invention.
Figure 3:
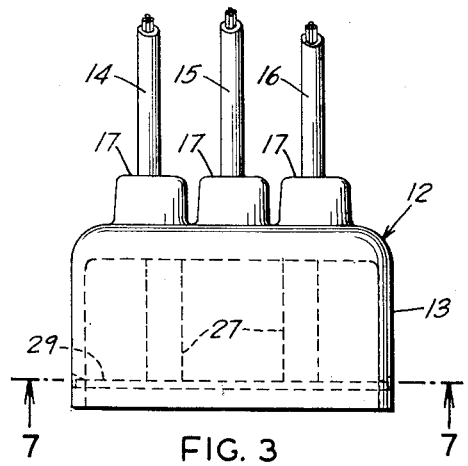
Fig. 3 is a view which might be termed an elevational view of the protective device of the present invention.
Figure 6:
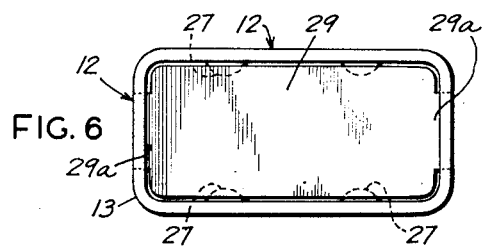
Fig. 6 is a bottom view of Fig. 3.
Figure 7:
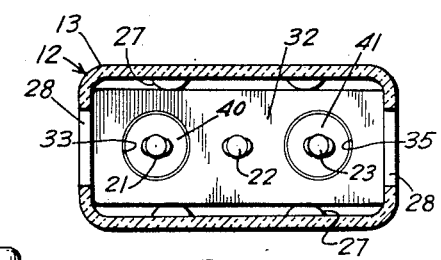
Fig. 7 is a sectional view taken on line 7—7 of Fig. 3.
Figure 4:
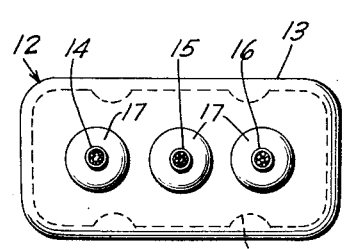
Fig. 4 is a top view of Fig. 3.
Figure 5:
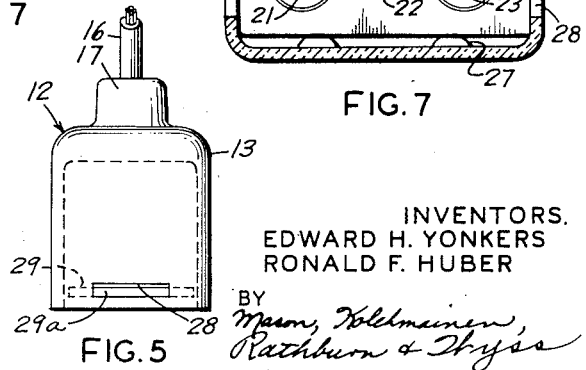
Fig. 5 is an end view of Fig. 3.

In Figs. 1 and 2 there are illustrated two common applications of the present invention. The first and most important location of the protective device 12 of the present invention is probably that shown in Fig. 2 of the drawings where the arrester is located at the secondary terminals of the distribution transformer. As illustrated in Fig. 2, it is mounted directly at the terminals with the leads 14 and 16 connected to the line terminals 50 and 51 of the distribution transformer 52. The lead 15, on the other hand, is connected to the ground terminal of the distribution transformer.

Where the secondary service from the transformer is of considerable length, such as 200 ft. or more, it is advisable to install a second protective device 12 on the line side of the conventional watt-hour meter, as shown in Fig. 1 of the drawings. The watt-hour meter is designated by the reference numeral 54. In order to reduce the hazard of shock within a building and the possibility of fire resulting from lightning, all metallic systems, such as water piping, should be connected to each other and to the service entrance driven grounds.

In view of the detailed description included above, the operation of the present invention will readily be understood by those skilled in the art. By virtue of the accurately molded housing 13, the arc gaps are established by a simple assembly operation yet assuring very accurate dimensioning of such arc gaps. Moreover, when an arc discharge occurs across the arc gaps, gases evolve from the insulating washers 40 or 41, as the case may be, and rapid extinguishment of such arc occurs within a maximum time of one-half cycle of the power current. This time is so short that it does not interfere with the operation of connected apparatus.

It will be understood that the present invention can also be used with suitable metal knockout boxes where application is desired in connection with enclosed wiring systems.

While there has been illustrated and described a preferred embodiment of the present invention, it will be apparent to those skilled in the art that numerous changes and modifications can be made. It is intended in the appended claims to cover all such changes and modifications as fall within the true spirit and scope of the present invention.

What is claimed as new and desired to be secured by Letters Patent of the United States is:

1. A protective device comprising an insulating housing, a plurality of spaced parallel conductors extending into said housing and held in spaced parallel insulated relationship by said housing, a conducting plate having a width and length approximating the dimensions of a plane bounded by the interior walls of said housing and perpendicular to the axes of said conductors, means defining a plurality of openings in said plate, the number of said openings corresponding to the number of said conductors, at least one of said openings having a diameter several times the diameter of another of said openings, the spacings between the centers of said openings and their position in said plate corresponding to the spacings between the centers of said conductors extending into said housing and their position in said plane, means for positioning said plate in said housing with the axes of said conductors passing perpendicularly through the centers of said corresponding openings in said plate, an insulating washer of slightly smaller diameter than said one opening disposed in said one opening coaxial with the conductor extending through said opening, a conducting washer in face to face engagement with said insulating washer to define an arc discharge path between the periphery of said conducting washer and the perimeter of said one opening, and means for electrically connecting said washer to the conductor coaxial therewith and said plate to said other of said conductors.

2. The protective device of claim 1 in which said last mentioned means also mechanically locks said plate, washers and conductors in accurately positioned assembled relationship.

3. A protective device comprising an accurately dimentioned molded insulating housing, a plurality of spaced parallel conductors extending into said housing and molded into one wall of said housing in accurately spaced parallel relationship, a conducting plate having a width and length approximating the dimensions of a plane bounded by the interior walls of said housing and perpendicular to the axes of said conductors, means defining a plurality of openings in said plate, the number of said openings corresponding to the number of said conductors, at least one of said openings having a diameter several times the diameter of another of said openings, the spacings between the centers of said openings and their position in said plate corresponding to the spacings between the centers of said conductors extending into said housing and their position in said plane, means comprising projections integrally formed with the interior walls of said housing for positioning said plate in said housing with the axes of said conductors passing perpendicularly through the centers of said corresponding openings in said plate, an insulating washer of slightly smaller diameter than said one opening disposed in said one opening in the plane of said plate and coaxial with the conductor extending through said opening, a conducting washer in face to face engagement with said insulating washer disposed outside the plane of said plate to define a spark gap between the periphery of said conducting washer and the perimeter of said one opening, and means for electrically connecting said washer to the conductor coaxial therewith and said plate to said other of said conductors.

4. A protective device comprising a somewhat cup shaped insulating housing open at one end, a plurality of spaced parallel conductors extending into said housing through the wall opposite said open end and held in spaced parallel insulated relationship by said housing, a conducting plate having a width and length approximating the dimensions of a plane bounded by the interior walls of said housing and perpendicular to the axes of said conductors, means defining a plurality of openings in said plate, the number of said openings corresponding to the number of said conductors, at least one of said openings having a diameter several times the diameter of another of said openings, the spacings between the centers of said openings and their position in said plate corresponding to the spacings between the centers of said conductors extending into said housing and their position in said plane, means for positioning said plate in said housing with the axes of said conductors passing perpendicularly through the centers of said corresponding openings in said plate, an insulating washer of slightly smaller diameter than said one opening disposed in said one opening in the plane of said plate and coaxial with the conductor extending through said opening, a conducting washer in face to face engagement with said insulating washer to define a spark gap between the periphery of said conducting washer and the perimeter of said one opening, means for electrically connecting said washer to the conductor coaxial therewith and said plate to said other of said conductors, and a cover for said open end of said housing.

5. A protective device comprising an insulating housing, a plurality of tubular conductors closed at one end and having their open ends molded into one wall of said housing so that the closed ends thereof extend into said housing in accurately spaced parallel relationship, a conducting plate having a width and length approximating the dimensions of a plane bounded by the interior walls of said housing and perpendicular to the axes of said conductors, means defining a plurality of openings in said plate, the number of said openings corresponding to the number of said tubular conductors, at least one of said openings having a diameter several times the diameter of another of said openings, the spacings between the centers of said openings and their position in said plate corresponding to the spacings between the centers of said tubular conductors extending into said housing and their position in said plane, means for positioning said plate in said housing with the closed ends of said tubular conductors extending through said openings and the axes of said conductors passing perpendicularly through the centers of said corresponding openings in said plate, an insulating washer formed of a material which evolves an arc extinguishing gas when subjected to the heat of an arc and having a slightly smaller diameter than said one opening disposed in said one opening coaxial with the conductor extending through said opening, a conducting washer in face to face engagement with said insulating washer to define a spark gap between the periphery of said conducting washer and the perimeter of said one opening, and means for electrically connecting said washer to the conductor coaxial therewith and said plate to said other of said conductors by deformations of said tubular conductors.

6. The protective device of claim 1 in which the number of said conductors is three with the two outer conductors passing through larger openings in said plate in each of which an insulating washer is disposed and said center conductor is electrically connected to said plate thereby to provide an arc discharge path between each of said outer conductors and said center conductor.

7. A protective device comprising an insulating housing, a plurality of spaced parallel conductors extending into said housing and held in spaced parallel insulated relationship by said housing, a conducting plate having a width and length approximating the dimensions of a plane bounded by the interior walls of said housing and perpendicular to the axes of said conductors, means defining a plurality of openings in said plate, the number of said openings corresponding to the number of said conductors, at least one of said openings having a diameter several times the diameter of another of said openings, the spacings between the centers of said openings and their position in said plate corresponding to the spacings between the centers of said conductors extending into said housing and their position in said plane, means integral with said housing defining said plane for positioning said plate in said housing with the axes of said conductors passing perpendicularly through the centers of said corresponding openings in said plate, an insulating washer of slightly smaller diameter than said one opening disposed in said one opening coaxial with the conductor extending through said opening, a conducting washer in face to face engagement with said insulating washer to define an arc discharge path between the periphery of said conducting washer and the perimeter of said one opening, and means for electrically connecting said washer to the conductor coaxial therewith and said plate to said other of said conductors and for simultaneously locking said parts in assembled relationship.

8. A protective device comprising an insulating housing, a plurality of tubular conductors closed at one end and having their open ends molded into one wall of said housing so that the closed ends thereof extend into said housing in accurately spaced parallel relationship, a plurality of insulated conductors having a portion of each extending into a different one of said follow conductors, a conducting plate having a width and length approximating the dimensions of a plane bounded by the interior walls of said housing and perpendicular to the axes of said conductors, means defining a plurality of openings in said plate, the number of said openings corresponding to the number of said tubular conductors, at least one of said openings having a diameter several times the diameter of another of said openings, the spacings between the centers of said openings and their position in said plate corresponding to the spacings between the centers of said tubular conductors extending into said housing and their position in said plane, means for positioning said plate in said housing with the closed ends of said tubular conductors extending through said openings and the axes of said conductors passing perpendicularly through the centers of said corresponding openings in said plate, an insulating washer formed of a material which evolves an arc extinguishing gas when subjected to the heat of an arc and having a slightly smaller diameter than said one opening disposed in said one opening coaxial with the conductor extending through said opening, a conducting washer in face to face engagement with said insulating washer to define a spark gap between the periphery of said conducting washer and the perimeter of said one opening, and means comprising a deformation of each of said tubular conductors for electrically connecting said washer to the conductor coaxial therewith and said plate to said other of said conductors while simultaneously connecting said insulated conductors to the associated tubular conductors.

9. A protective device comprising an insulating housing, a plurality of tubular conductors closed at one end and having their open ends molded into one wall of said housing so that the closed ends thereof extend into said housing in accurately spaced parallel relationship, a plurality of insulated conductors having a portion of each extending into a different one of said follow conductors, a conducting plate having a width and length approximating the dimensions of a plane bounded by the interior walls of said housing and perpendicular to the axes of said conductors, means defining a plurality of openings in said plate, the number of said openings corresponding to the number of said tubular conductors, at least one of said openings having a diameter several times the diameter of another of said openings, the spacings between the centers of said openings and their position in said plate corresponding to the spacings between the centers of said tubular conductors extending into said housing and their position in said plane, means for positioning said plate in said housing with the closed ends of said tubular conductors extending through said openings and the axes of said conductors passing perpendicularly through the centers of said corresponding openings in said plate, an insulating washer formed of a material which evolves an arc extinguishing gas when subjected to the heat of an arc and having a slightly smaller diameter than said one opening disposed in said one opening coaxial with the conductor extending through said opening, a conducting washer in face to face engagement with said insulating washer to define a spark gap between the periphery of said conducting washer and the perimeter of said one opening, and means comprising a deformation of each of said tubular conductors for electrically connecting said washer to the conductor coaxial therewith and said plate to said other of said conductors while simultaneously connecting said insulated conductors to the associated tubular conductors, said insulated conductors being formed of a low resistance material to limit the follow current during an arc discharge.

10. The protective device of claim 9 in which said insulated conductors are formed of stainless steel.

EDWARD H. YONKERS.
RONALD F. HUBER.

No references cited.